United States Patent
Willemin et al.

(10) Patent No.: US 9,310,272 B2
(45) Date of Patent: Apr. 12, 2016

(54) ELECTRONIC DEVICE PROVIDED WITH AUTOMATIC LEAK DETECTION MEANS

(71) Applicant: The Swatch Group Research and Development Ltd, Marin (CH)

(72) Inventors: Michel Willemin, Preles (CH); Jean-Claude Martin, Montmollin (CH); Christophe Germiquet, Preles (CH)

(73) Assignee: The Swatch Group Research and Development Ltd, Marin (CH)

( * ) Notice: Subject to any disclaimer, the term of this patent is extended or adjusted under 35 U.S.C. 154(b) by 284 days.

(21) Appl. No.: 14/173,981

(22) Filed: Feb. 6, 2014

(65) Prior Publication Data

US 2014/0230526 A1 Aug. 21, 2014

(30) Foreign Application Priority Data

Feb. 21, 2013 (EP) ..................... 13156179

(51) Int. Cl.

| | |
|---|---|
| *G01M 3/34* | (2006.01) |
| *G01M 3/32* | (2006.01) |
| *G04D 7/00* | (2006.01) |
| *G04G 21/02* | (2010.01) |
| *G04B 37/02* | (2006.01) |

(52) U.S. Cl.
CPC .............. *G01M 3/329* (2013.01); *G04B 37/02* (2013.01); *G04D 7/007* (2013.01); *G04G 21/02* (2013.01)

(58) Field of Classification Search
CPC ....... G01M 3/329; G04D 7/007; G04B 37/02; G04G 21/02
See application file for complete search history.

(56) References Cited

U.S. PATENT DOCUMENTS

| | | | | |
|---|---|---|---|---|
| 3,306,098 | A * | 2/1967 | Kraus ..................... | G01M 3/20 73/49.3 |
| 3,355,932 | A * | 12/1967 | Mulligan ............... | G04D 7/007 73/149 |
| 3,517,547 | A * | 6/1970 | Morf ...................... | G04D 7/007 73/45.5 |
| 3,792,607 | A * | 2/1974 | Fukuda .................. | G04D 7/007 73/49.3 |
| 3,793,877 | A * | 2/1974 | Fukuda .................. | G04D 7/007 73/49.3 |

(Continued)

FOREIGN PATENT DOCUMENTS

| | | |
|---|---|---|
| EP | 1 006 418 A1 | 6/2000 |
| EP | 1 219 940 A2 | 7/2002 |

(Continued)

OTHER PUBLICATIONS

European Search Report of Application No. 13 15 6179 dated Jun. 28, 2013.

*Primary Examiner* — Laura Martin
*Assistant Examiner* — Samir M Shah
(74) *Attorney, Agent, or Firm* — Sughrue Mion, PLLC

(57) ABSTRACT

The electronic device (1) is provided with an automatic leak detection means, notably for a gas leak, in the case (2) of the device. The automatic leak detection means includes an internal pressure sensor (3), an external pressure sensor (4) and a calculation unit (5) connected to the internal pressure sensor and to the external pressure sensor. The calculation unit, which is a microcontroller, and the internal pressure sensor are arranged inside the case, whereas the external pressure sensor is arranged on an external surface of the case. The microcontroller (5) checks, based on measurements performed by the pressure sensors over time, whether the pressure variation inside the case is different from the pressure variation outside the case to determine whether or not the case has a sufficient degree of sealing.

15 Claims, 2 Drawing Sheets

(56) References Cited

U.S. PATENT DOCUMENTS

| | | | | |
|---|---|---|---|---|
| 3,802,251 | A * | 4/1974 | Durr | G04D 7/007 73/1.48 |
| 4,326,408 | A * | 4/1982 | Kanoh | G04D 7/007 73/49.3 |
| 4,663,964 | A * | 5/1987 | Croce | G01M 3/363 73/49.3 |
| 4,934,180 | A * | 6/1990 | Hulsman | G01M 3/366 73/49.3 |
| 5,105,654 | A * | 4/1992 | Maruyama | G01M 3/363 73/49.3 |
| 5,226,316 | A * | 7/1993 | Mally | G01M 3/363 73/49.2 |
| 5,228,306 | A * | 7/1993 | Shyu | F24F 1/027 236/49.3 |
| 5,799,639 | A * | 9/1998 | Isobe | F02M 25/0809 123/198 D |
| 2005/0270908 | A1 * | 12/2005 | Gueissaz | G04D 7/007 368/11 |
| 2009/0277251 | A1 * | 11/2009 | Takakura | F02M 25/0809 73/40.7 |
| 2013/0312494 | A1 * | 11/2013 | Nishimura | G01M 3/025 73/45.5 |
| 2014/0230525 | A1 * | 8/2014 | Willemin | G01M 3/002 73/49.3 |

FOREIGN PATENT DOCUMENTS

| | | | |
|---|---|---|---|
| EP | 1 388 766 A1 | 2/2004 | |
| JP | 57033337 A * | 2/1982 | G01M 3/02 |
| JP | 2006-322867 A | 11/2006 | |
| JP | 2010-151656 A | 7/2010 | |

* cited by examiner ved with an automatic leak detection means, i.e. for checking a certain sealing of an electronic device case. The electronic device may be an electronic apparatus of large dimensions or preferably a portable electronic instrument, such as a mobile telephone or watch, such as a wristwatch.

ELECTRONIC DEVICE PROVIDED WITH AUTOMATIC LEAK DETECTION MEANS

This application claims priority from European Patent Application No. 13156179.7 filed 21.02.2013, the entire disclosure of which is incorporated herein by reference.

FIELD OF THE INVENTION

The invention concerns an electronic device, which is provided with an automatic leak detection means, i.e. for checking a certain sealing of an electronic device case. The electronic device may be an electronic apparatus of large dimensions or preferably a portable electronic instrument, such as a mobile telephone or watch, such as a wristwatch.

The invention also concerns an automatic leak detection method for an electronic device.

BACKGROUND OF THE INVENTION

An electronic device may be, for example, a wristwatch. This watch is formed of mechanical and electronic parts, which generally require protection from water or moisture or various gases in the environment. Leak detection, generally of gas, has to be performed to determine a degree of sealing of the watch and mainly of the case containing all the watch components. This degree of sealing is normally determined when the watch model is designed, i.e. according to the thickness of the case with the watch glass and sealing gaskets.

The watch sealing measurement can be defined as a pressure calculated in atm or hectopascals. Different degrees of sealing can be defined. For example, for hand washing with a watch worn on the wrist, the watch must be capable of withstanding a pressure of around 3 atm, which is equivalent to a pressure of around 3040 hectopascals. To take a shower or swim in a pool with the watch, the watch must be capable of withstanding a pressure of around 5 atm, which is equivalent to a pressure of around 5066 hectopascals. For diving in a swimming pool, the watch must be able to withstand at least 10 atm pressure, which is equivalent to a pressure of around 10133 hectopascals.

There exist various seal checking instruments particularly electronic devices in the form of watches having a case. It is known to use an instrument which operates using compressed air to perform the seal test. It is possible to observe, for example, whether the watch crystal deforms when the watch is placed under pressure. If the watch crystal deforms, this indicates that the watch is well sealed, whereas if no deformation is observed, the watch is not considered sealed. This type of compressed air instrument permits a watch to be checked in similar conditions to those of normal use. An example of this type of checking instrument is one of the instruments sold under reference SM 8850-XX by Sigma Electronic SA in Bienne, Switzerland.

However, with every known type of seal checking instrument, this complicates the method of guaranteeing the proper sealing of an electronic device, such as a wristwatch. The seal checking costs for each electronic device are therefore high. Generally speaking, there is nothing provided in the state of the art to enable leak detection to be performed for an electronic device with means peculiar to the electronic device, which is a drawback.

JP Patent Application No. 2010-151656, which discloses a device for diagnosing the sealing of case, may be cited. An atmospheric pressure sensor is disposed in the case for determining the variation in pressure if a leak is detected through the case. However, this type of device cannot determine the variation in pressure outside the case and take account thereof in diagnosing the sealing of the case, which is a drawback.

EP Patent Application No. 1 388 766 A1 also discloses a device for checking the sealing of a sealed watch case. To achieve this, a pressure sensor is disposed in the case for determining pressure variations inside the case, but the invention does not provide for normal external pressure variations to be taken into account, which is a drawback.

SUMMARY OF THE INVENTION

It is therefore an object of the invention to provide an electronic device, which is provided with an automatic leak detection means, capable of overcoming the drawbacks of the state of the art, and permitting a simple and inexpensive measurement to be made of the degree of sealing of the electronic device.

The invention therefore concerns an electronic device, which is provided with an automatic leak detection means of a case of the electronic device, wherein the automatic leak detection means includes an internal pressure sensor, an external pressure sensor and a calculation unit connected to the internal pressure sensor and to the external pressure sensor, the calculation unit and the internal pressure sensor being arranged inside the case, whereas the external pressure sensor is arranged on an external surface of the case, and wherein the calculation unit is intended to check, based on measurements made by the internal pressure sensor and the external pressure sensor over time, whether or not the variation in pressure inside the case is different from the variation in pressure outside the case to determine whether or not the case has a degree of sealing above or below a determined limit.

Particular embodiments of the electronic device are defined in the dependent claims 2 to 11.

One advantage of the electronic device lies in the fact that the automatic leak detection means for determining the degree of sealing of the device is formed of relatively inexpensive elements. No particular arrangement is provided for fixing the internal pressure sensor inside the case of the electronic device. The external pressure sensor is arranged on an external surface of the case and connected in a sealed manner through the case to a calculation unit. The calculation unit, which is preferably a microcontroller, is connected to a printed circuit board like the internal pressure sensor. The calculation unit is thus connected to both sensors and can receive electrical power from a voltage source, which may be a battery, cell or accumulator for an electronic device, such as a wristwatch.

Advantageously, the microcontroller is arranged to check continuously, or at programmed time periods, the pressure values of the two sensors. The microcontroller can check whether the pressure variation of the internal pressure sensor is very different from the pressure variation of the external pressure sensor. This means that the case has a sufficient degree of sealing within a well defined measured pressure variation margin.

Advantageously in the case of an electronic watch, the microcontroller can automatically detect whether the case has been properly closed again after a cell or battery change.

The invention therefore also concerns an automatic leak detection method for an electronic device, which is provided with an automatic leak detection means of a case of the electronic device, the automatic leak detection means including an internal pressure sensor, an external pressure sensor and a calculation unit connected to the internal pressure sensor and to the external pressure sensor, the calculation unit and the internal pressure sensor being arranged inside the case, whereas the external pressure sensor is arranged on an external surface of the case, wherein the method includes the steps of:

actuating the calculation unit, the internal pressure sensor and the external pressure sensor, checking in the calculation unit, based on measurements performed by the internal pressure sensor and the external pressure sensor over time, whether the pressure variation in the case is different from the pressure variation outside the case, and determining as a function of the internal pressure variation and of the external pressure variation, whether the case has a degree of sealing above or below a determined limit.

Particular steps of the method are defined in the dependent claims 13 to 15.

BRIEF DESCRIPTION OF THE DRAWINGS

The objects, advantages and features of the electronic device and of the automatic leak detection method for the electronic device will appear more clearly in the following description, based on a simplified non-limiting embodiment illustrated by the drawings, in which.

DETAILED DESCRIPTION OF THE INVENTION

In the following description, all those electronic components of the electronic device that are well known to those skilled in the art in this technical field will be described only in a simplified manner. The electronic device may be an electronic instrument of large dimensions, where automatic leak detection is required to be performed to protect certain components placed inside the case of the instrument. Preferably, the electronic device may be a portable electronic instrument, such as a mobile telephone or a watch, such as a wristwatch.

Figure 1:
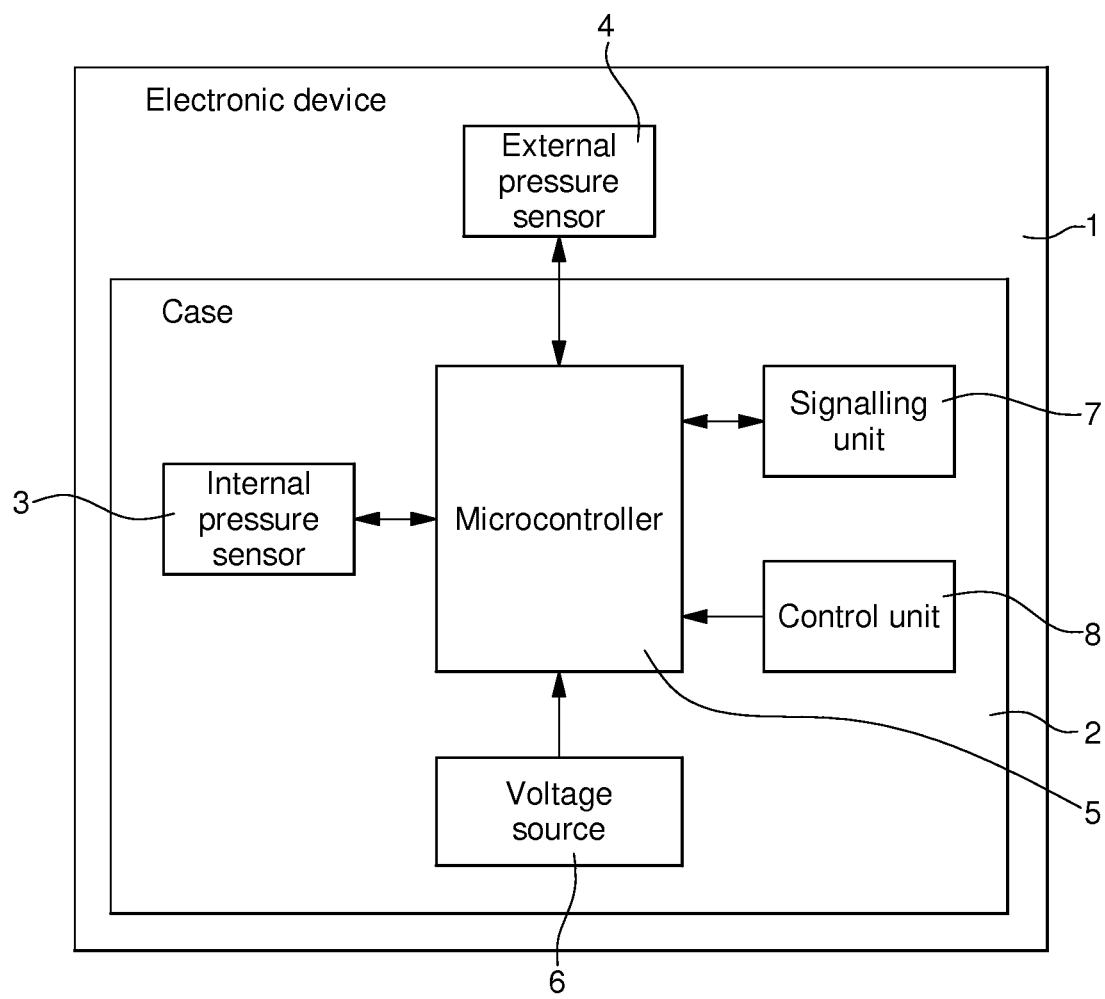
FIG. 1 shows a simplified view of an electronic device provided with an automatic leak detection means according to the invention.

FIG. 1 shows a schematic view of an electronic device 1, which may for example be a wristwatch, but is not however limited to the technical field of horology. Electronic device 1 includes an automatic leak detection means, notably for a gas leak through a case 2 of the device. This means it is possible to determine whether the electronic components of the electronic device are disposed inside a case which is normally hermetically sealed and with a sufficient degree of sealing. The detection does not guarantee that the case is totally sealed, but only indicates a degree of sealing within a determined limit. To achieve this, a pressure variation has to occur for a leak in the case to be automatically detected.

Generally speaking, for the automatic leak detection, electronic device 1 includes at least one internal pressure sensor 3 and at least one external pressure sensor 4. External pressure sensor 4 can be used to determine the ambient air pressure, or the water pressure during a dive for a device in the form of a diver's watch. Internal pressure sensor 3 and external pressure sensor 4 are both connected to a calculation unit, which is preferably a microcontroller 5. The microcontroller can be electrically powered by a voltage source 6, so as also to power the two sensors 3 and 4 during their operation. This voltage source 6 may be a cell, battery or accumulator, in the case of an electronic device 1 in the form of a mobile telephone or a watch, such as a wristwatch.

Microcontroller 5 and internal pressure sensor 3 are disposed on a conventional printed circuit board, and entirely inside case 2 of electronic device 1, with no contact with the exterior. Conversely, external pressure sensor 4 is disposed in a housing provided on an external surface of case 2. The electrical connection of external pressure sensor 4 to the printed circuit board carrying microcontroller 5 is achieved in a conventional and sealed manner through the case. The positioning and connection of this type of external pressure sensor 4 are for example described in EP Patent No 1 544 696 B1 for the case of a device in the form of a wristwatch. FIG. 4 of EP Patent No 1 544 696 B1, which is described in paragraphs 23 and 24 of the description, shows a cross-section of a watch with this pressure sensor. This type of external pressure sensor may also be used for measuring an altitude after calibration by the microcontroller.

A temperature sensor (not shown) may also be connected to internal pressure sensor 3. Internal pressure sensor 3 and the temperature sensor may thus form part of the same electronic module. This electronic module is available on the market at a low cost. The EPCOS AG module T5400 may be used. This electronic module may easily be fixed to the printed circuit board without requiring any specific protection inside case 2. In the case of a wristwatch, the printed circuit board carrying the various electronic components is located between the watch dial and the back cover of the case, supported on an inner edge of the middle part of case 2.

Electronic device 1 further includes a signalling unit 7. This signalling unit 7 can inform or warn a user of any observed leak in the electronic device. Signalling unit 7 mainly delivers one piece of information, whether or not case 2 is considered to be sealed. For the case of a wristwatch, the signalling unit may be a display device for example an LCD or LED or OLED device or various other types of display devices. The signalling unit may also be formed by one or more hands. The hands may be conventional time indicator hands moved in a signalling mode to indicate a sealing defect. This signalling unit may also be a sound generator for generating a continuous or intermittent sound, or a vibrator.

A control unit 8 may also be provided in electronic device 1. This control unit 8 may be a control button for any type of electronic device 1. In the case of a wristwatch or a mobile telephone, this control unit 8 may be formed by one or more buttons or crowns or capacitive tactile keys. These tactile keys may be arranged underneath a watch crystal or telephone glass screen or on the periphery of the watch crystal or telephone glass screen. Control unit 8 can be manually actuated for example to activate the automatic leak detection or to obtain various pieces of information from the electronic device. However, the automatic leak detection could always be able to be actuated independently of any action on the control unit.

In microcontroller 5, the change of gas pressure inside case 2 of the electronic device can be checked by internal pressure sensor 3, relative to the change in pressure detected by external pressure sensor 4. It is evidently necessary for there to be a variation in external pressure or internal pressure in order for a leak in the case of the device to be automatically detected. Generally, if the internal pressure varies in a similar manner to the external pressure, this means that the case has an insufficient degree of sealing. However, if the variation in time of external pressure is quite different from the variation in time of internal pressure, this may mean that the degree of sealing of the case may be considered sufficient.

Microcontroller 5 can calculate the difference between the internal pressure and external pressure at successive time intervals or continuously. If the difference is greater than a determined reference taking into account one or more measurements at successive time intervals, the case can be considered to be sufficiently sealed. In principle, this difference may be greater than the determined reference after a long period of time, notably after the cell or battery of the device has been changed. This reference may be defined for example at a value of 2 hectopascals or higher. The maximum internal pressure change speed allowed within the field of horology is generally 3 hours for a change from the initial pressure to the current ambient pressure.

The internal pressure inside case 2 of electronic device 1 varies with temperature. Generally in a sufficiently sealed case, the internal pressure can vary within a defined margin proportional to temperature. Thus, a temperature sensor may also be provided inside the case, connected to internal pressure sensor 3, in order, for example, to cancel out the effect of temperature.

In this regard, it should be noted that for a gas, the gas pressure p inside the inner volume V of case 2 of electronic device 1 is set by the formula $p \cdot V = n \cdot R \cdot T$, where T is the temperature, n is the quantity of material expressed in moles, and R is the universal gas constant. According to another alternative degree of sealing measurement, it is also possible to check whether the variation in internal gas pressure is proportional or within a defined margin proportional to the temperature variation. This means that in principle the p/T ratio must be constant for a determined period of time to ensure that case 2, for example of the watch or mobile telephone, is properly sealed.

To eliminate the effect of temperature, microcontroller 5 can also determine a standardised pressure $p_n$ with reference to a temperature of 298° K which is a temperature of 25° C. $T_{25° C}$. The p/T ratio between a pressure value p measured by the internal pressure sensor and a temperature value T measured by the temperature sensor must be equal to $p_n/T_{25° C}$. Thus standardised pressure $p_n$ corresponds to $(p/T) \cdot T_{25° C}$.

Generally, if the p/T ratio is still constant, for example after 10 hours, or if the variations in external pressure and internal pressure are very different, the case 2 of the watch or mobile telephone may be considered sealed. The standardized pressure generally remains constant relative to the internal pressure if the case is considered sealed. It is specified within the field of horology and NIHS standards that a watch case 2 is sealed if less than 50 μg of gas is lost per minute through the case at a pressure difference of around 2 bars between the external pressure and internal pressure. This normally means that it takes around 3 hours to balance the internal pressure and external pressure as mentioned above.

If microcontroller 5 determines that the the internal and external pressure variations are substantially similar in time, the user of the watch or mobile telephone is informed by signalling unit 7 that the watch or telephone is no longer guaranteed to be sealed. The same is true if an internal pressure and temperature measurement is performed with a p/T ratio which is no longer constant. This measurement can be automatically performed under the control of microcontroller 5 in electronic device 1, for example every hour. In the case of a watch, a seal check may be performed at each every set time interval between 1 and 6 hours. However, microcontroller 5 may be programmed to continuously determine the internal pressure variation relative to the external pressure variation, and to calculate, after each determined time interval, the difference between the internal pressure value and the external pressure value.

It is possible to envisage microcontroller 5 taking into account several internal pressure and external pressure values in time periods or intervals of less than one hour. These values are stored and/or the difference between each internal pressure value and each external pressure value in time may also be stored. The time intervals may also be on the order of one minute or several minutes. If the difference between the pressure values remains above or below a determined reference at a stabilised temperature, it is possible to observe whether or not case 2 has a sufficient degree of sealing.

In the case of a watch, such as a wristwatch, sealing gaskets are used between the parts of the case to be secured to each other. These sealing gaskets or joints, which are compressed when the back cover of the case is closed onto the middle part, do not generally ensure total sealing. Gas and mainly air can pass through these sealing gaskets over time. The sealing gaskets or joints made of plastic material are permeable. The joints may also be dirty, which unseals the case.

With microcontroller 5 automatically monitoring the pressures continuously or at short time intervals, it is quickly possible to tell whether or not the case is closed properly when the watch battery is changed. The electrical power for operating microcontroller 5 and sensors 3 and 4 to determine the degree of sealing of case 2 has a low value, which does not shorten the watch cell or battery life. The gas pressure inside the inner volume of case 2 may increase between an external ambient pressure value of 970 hectopascals prior to closure and an inner pressure value of around 1020 hectopascals, or 1150 hectopascals after the case has been closed. This means at least 5% additional pressure in the inner volume of the case after closure. Thus, with a good seal, the difference between the external pressure and internal pressure remains greater than a determined reference at a stabilised temperature after the case has been closed.

If the case has not been closed properly, the inner pressure and external ambient pressure are quickly balanced with a high pressure variation after only around ten seconds, or after 1 to 5 minutes, with respect to the temperature variation. A large difference in internal pressure is observed at the moment when the case is closed, and a large inverse difference in internal pressure may also be observed after closure, if the case is not closed properly or a gasket is damaged, out of position or missing. The person, normally the watchmaker, can thus be immediately informed as to whether or not the case has been properly closed to guarantee a sufficient degree of sealing of the closed case.

It is to be noted that a warning may also be provided to the person wearing the watch, if the sealing gaskets or joints are dried out or worn or have moved, which results in an insufficient degree of sealing. It is possible to replace these sealing gaskets and subsequently observe that microcontroller 5 is no longer indicating a sealing defect. If there is no indication from signalling unit 7, the person wearing the watch is assured that the watch has a sufficient degree of sealing for the application required for the watch.

The excess gas pressure inside the inner case volume after said case 2 has been closed will very slowly diminish at a constant temperature, if the watch is sealed. The pressure measured inside may be the ambient pressure within a time period which may be well beyond 10 hours and even up to a month. This is dependent on the sealing gasket of the watch. However, if after 1 hour a significant difference is observed in the pressure measured inside the watch at the same temperature, this means that the watch is no longer sealed and the user is immediately informed. In these conditions, the internal pressure will be balanced with the external pressure.

Figure 2:
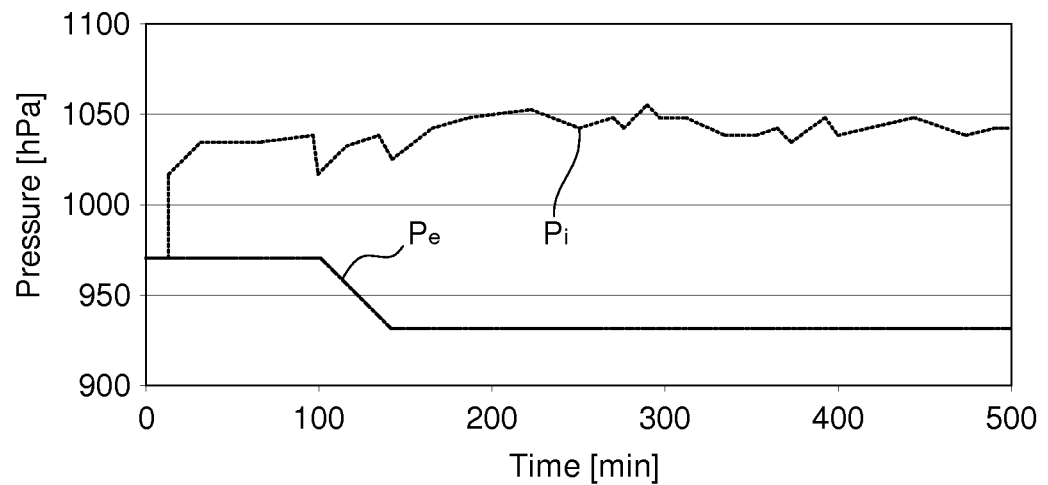
FIG. 2 shows a graph of the pressure variations detected by the two pressure sensors for an electronic device defined as sealed according to the invention.
Figure 3:
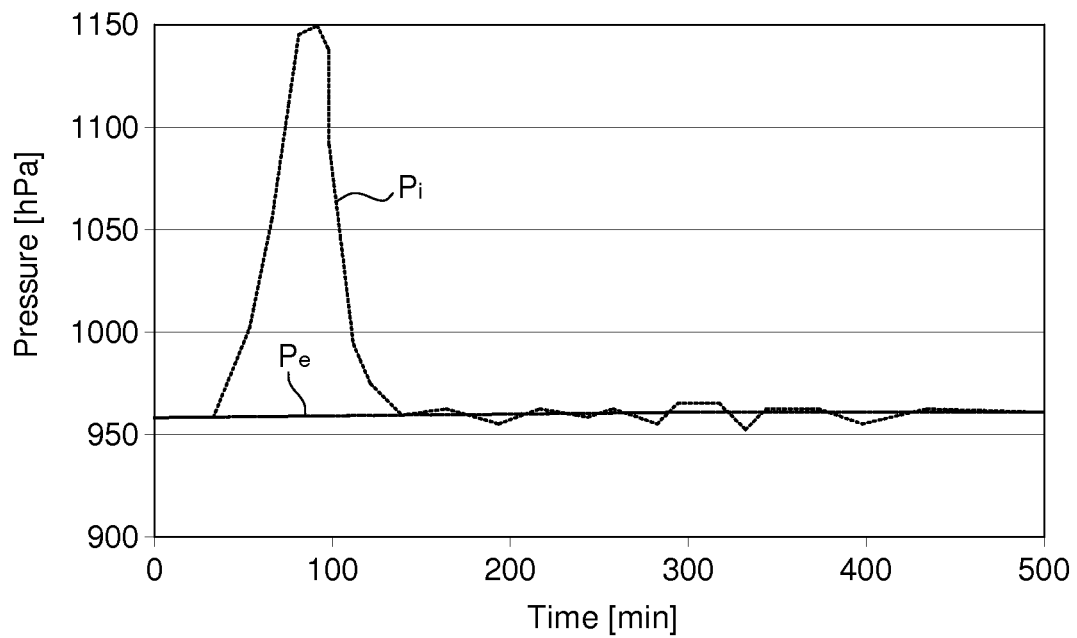
FIG. 3 shows a graph of the pressure variations detected by the two pressure sensors for an electronic device defined as not sealed according to the invention.

The difference between a case 2 considered to be sufficiently sealed and a case considered not to be sealed and indicated to a user is well illustrated in FIGS. 2 and 3. FIGS. 2 and 3 mainly show a graph of the variation in internal pressure Pi and the variation in external pressure Pe with a temperature which may slightly vary with time.

The microcontroller checks the internal and external pressure variation continuously or at successive time intervals. In principle, the microcontroller can determine the difference in absolute value between the internal pressure and external pressure at several successive time intervals. If the difference between the two pressures remains greater than the determined reference, for example greater than a value of 2 hectopascals or more, the case can then be considered to have a sufficient degree of sealing. This pressure difference $\Delta p$ may be defined each hour for example, or for time intervals of up to 6 hours so as to check whether the difference is greater or smaller than the pressure reference. However, it may also be defined as a function of shorter successive instants.

FIG. 2 shows a graph of the pressure variation Pi inside a watch case and of the external pressure variation Pe with time. At the start of the measurement, the case is open notably to change a battery. The pressure is thus measured at an initial value of 970 hectopascals, which is the external ambient pressure. The temperature in this case prior to closure is, for example, 25° C. After 10 or 20 minutes, the back cover of the case is fixed to the middle part compressing a sealing gasket, which generates excess pressure and the internal pressure is thus measured at a value of around 1040 hectopascals.

The watch is then worn on the user's wrist, which means the temperature T will vary substantially from 25° C. to a little more than 30° C. It is noted that once the watch case has been closed, the internal pressure Pi measured by the internal pressure sensor may vary with the temperature variation. This internal pressure varies within a margin proportional to the temperature variation for close to 8 hours after the battery change. After 100 minutes, the external pressure Pe will decrease from a value of 970 hectopascals to a value of 930 hectopascals without affecting the internal pressure measurement. It is easy to see that the change in internal pressure measured by the internal pressure sensor is different from the change in external pressure measured by the external pressure sensor. The watch case can thus be considered as having a sufficient degree of sealing, since the difference between the two pressures, even after several hours, remains greater than the determined reference.

FIG. 3, however, shows a graph of the pressure variation Pi inside a watch case and of the external pressure variation Pe with time in the case of a non-sealed case. At the start, the watch case is open to change the battery. The pressure Pi measured by the internal pressure sensor has a value of around 960 hectopascals, just like the external pressure Pe measured by the external pressure sensor. After 40 minutes, the case is closed again and the internal pressure increases to a value of up to 1150 hectopascals. However, after less than 2 hours, the internal pressure Pi returns to a value close to the external ambient pressure Pe at 960 hectopascals, even with a slight temperature variation. The difference in pressures will become less than the determined reference. In these conditions the watch case is indicated as having an insufficient degree of sealing.

From the description that has just been given, those skilled in the art can devise several variants of the electronic device provided with automatic leak detection means without departing from the scope of the invention defined by the claims. The electronic device may be a watch, such as a diver's watch, to quickly inform the person wearing the watch as to whether or not the watch can be considered to have a sufficient degree of sealing. However, where a diver's watch is considered to have a sufficient degree of sealing by the automatic leak detection means, this does not guarantee 100% sealing for performing a dive, since in these conditions account must also be taken of the deformation of the various parts of the watch as a function of depth.

What is claimed is:

1. An electronic device, which is provided with an automatic leak detection means of a case of the electronic device, wherein the automatic leak detection means includes an internal pressure sensor, an external pressure sensor and a calculation unit connected to the internal pressure sensor and to the external pressure sensor, the calculation unit and the internal pressure sensor being arranged inside the case, whereas the external pressure sensor is arranged on an external surface of the case, and wherein the calculation unit is configured to check, based on respective measurements made by the internal pressure sensor and the external pressure sensor over time, whether or not the variation in pressure inside the case is different from the variation in pressure outside the case to determine whether or not the case has a degree of sealing above or below a determined limit.

2. The electronic device according to claim 1, wherein the calculation unit is intended to calculate, at successive time intervals, a difference between the internal pressure and the external pressure so as to determine whether the case has a degree of sealing above a determined limit, if the difference is greater than a determined reference value, or a degree of sealing below a determined limit, if the difference is less than the determined reference value.

3. The electronic device according to claim 2, wherein the calculation unit is intended to continuously determine the internal pressure variation relative to the external pressure variation, and to calculate after each determined time interval, the difference between the internal pressure and the external pressure.

4. The electronic device according to claim 1, wherein the electronic device is a watch or a mobile telephone.

5. The electronic device according to claim 1, wherein the calculation unit is a microcontroller.

6. The electronic device according to claim 5, wherein the microcontroller is powered by a voltage source disposed inside the case.

7. The electronic device according to claim 6, wherein the voltage source is a battery or accumulator.

8. The electronic device according to claim 6, wherein the microcontroller and the internal pressure sensor and the external pressure sensor are actuated at the moment of connection of the voltage source or after the actuation of a control unit.

9. The electronic device according to claim 8, which is a watch or a mobile telephone, wherein the control unit is formed by one or more buttons or crowns or capacitive tactile keys disposed underneath a watch crystal or telephone glass screen or at the periphery of a watch crystal or telephone glass screen.

10. The electronic device according to claim 1, wherein the calculation unit controls a signalling unit of the electronic device so as to indicate a degree of sealing below a determined limit.

11. The electronic device according to claim 10, which is a watch or a mobile telephone, wherein the signalling unit is a display device or one or more hands for the watch, or a sound generator for generating a continuous or intermittent sound, or a vibrator.

12. An automatic leak detection method for an electronic device, which is provided with an automatic leak detection means of a case of the electronic device, the automatic leak detection means including an internal pressure sensor, an external pressure sensor and a calculation unit connected to the internal pressure sensor and to the external pressure sensor, the calculation unit and the internal pressure sensor being arranged inside the case, whereas the external pressure sensor is arranged on an external surface of the case, wherein the method includes the steps of:

actuating the calculation unit, the internal pressure sensor and the external pressure sensor, checking in the calculation unit, based on respective measurements performed by the internal pressure sensor and the external pressure sensor over time, whether the pressure variation in the case is different from the pressure variation outside the case, and determining as a function of the internal pressure variation and of the external pressure variation, whether the case has a degree of sealing above or below a determined limit.

13. The method according to claim 12, wherein, in order to check the internal pressure variation and the external pressure variation in the case, the calculation unit calculates, at successive time intervals, the difference between the internal pressure and the external pressure so as to determine whether the case has a degree of sealing above a determined limit, if the difference is greater than a determined reference value, or a degree of sealing below a determined limit, if the difference is less than the determined reference value.

14. The method according to claim 13, wherein the calculation unit continuously determines the internal pressure variation relative to the external pressure variation, and after each determined time interval, calculates the difference between the internal pressure and the external pressure.

15. The method according to claim 13, wherein a warning is provided by the electronic device when the degree of sealing of the electronic device is determined to be below a determined limit, if the difference is less than the determined reference value.

\* \* \* \* \*